United States Patent [19]

Riley et al.

[11] Patent Number: 4,472,972
[45] Date of Patent: Sep. 25, 1984

[54] ULTRASOUND IMAGING SYSTEM EMPLOYING OPERATOR CONTROLLED FILTER FOR REFLECTED SIGNAL ATTENUATION COMPENSATION

[75] Inventors: James K. Riley, Shingle Springs; William R. Hardin, North Highlands, both of Calif.

[73] Assignee: General Electric Company, Rancho Cordova, Calif.

[21] Appl. No.: 437,183

[22] Filed: Oct. 27, 1982

[51] Int. Cl.³ .............................................. G01N 29/00
[52] U.S. Cl. ........................................ 73/520; 73/620; 73/629
[58] Field of Search ................. 73/629, 631, 620, 642, 73/602, 618

[56] References Cited

U.S. PATENT DOCUMENTS 4,016,750  4/1977  Green .............................. 73/631 X

*Primary Examiner*—Stephen A. Kreitman
*Assistant Examiner*—James R. Giebel
*Attorney, Agent, or Firm*—Flehr, Hohbach, Test, Albritton & Herbert

[57] ABSTRACT

The amplitudes of electrical signals generated by a transducer in an ultrasound scanning system are controlled by applying the electrical signals to an electrical filter whose frequency pass characteristics can be varied. As the ampltude and frequency of the generated electrical signals decrease due to passage through tissue, the low frequency of the filter is reduced. The control of the filter can be automatically implemented or can be manually implemented by the system operator.

9 Claims, 6 Drawing Figures

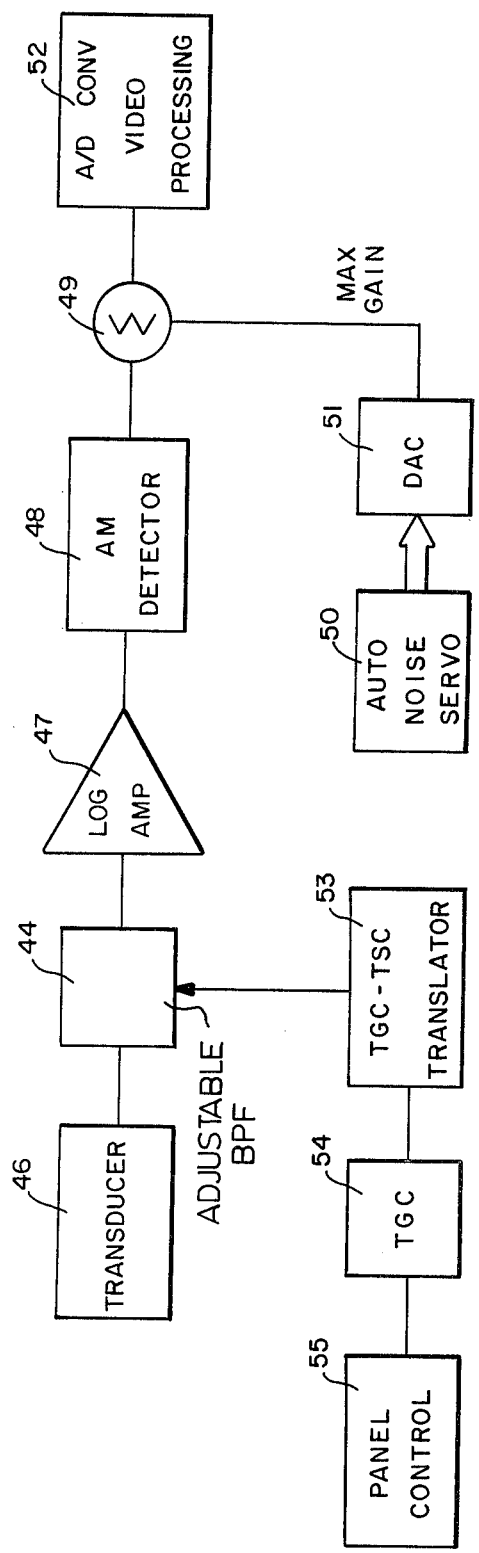
FIG. — 2

ULTRASOUND IMAGING SYSTEM EMPLOYING OPERATOR CONTROLLED FILTER FOR REFLECTED SIGNAL ATTENUATION COMPENSATION

This invention relates generally to ultrasonic scanning systems, and more particularly the invention relates to an ultrasound imaging system in which compensation for signal attenuation is accomplished with a controlled variable filter.

Ultrasonic scanning systems are known and commercially available for medical diagnostic purposes. See for example U.S. Pat. No. 4,172,386 for "Video A Trace Display System for Ultrasonic Diagnostic System" and U.S. Pat. No. 4,204,433 for "Computerized Ultrasonic Scanner With Technique Select". The commercially available Datason ultrasonic system of General Electric Company provides an A trace display along with both real time and static images on a television display.

Briefly, such systems utilize sound transducers to transmit ultrasonic (e.g. on the order of several megahertz) waves into a patient and to receive echo signals. In one mode of operation, the transducer is attached to a plurality of hinged arms for movement in a single plane, and potentiometers associated with the hinged arms produce signals which identify the transducer in position. Alternatively, a hand held transducer or a linear transducer array can be employed. Conventionally, the echo signals are applied to a variable gain amplifier to adjust the echo signals for attenuation when passing through the patient. The adjusted signals are then passed through an analog to digital conversion and video processing circuitry and thence either to standard converter circuitry for controlling the body scan display or to A trace conversion circuitry for graphically depicting the ultrasonic pulse echo. The echo amplitude is typically graphically represented as the ordinate value, while the echo return time (indicative of body depth) is reproduced on the abscissa. Accordingly, by viewing the A trace one may determine the depth into the body of each discontinuity in the pulse propagation path and the type of media transition.

It is known that tissue attenuation of an ultrasonic wave affects not only the magnitude but also the frequency of the reflected wave. Copending application Ser. No. 369,370 now U.S. Pat. No. 4,452,085 filed Apr. 19, 1982 for "Method and Means For Generating Time-gain Compensation Control Signal For Use in Ultrasonic Scanner and the Like" correlates signal amplitude to signal frequency and establishes a gain control signal based on the frequency (or zero crossings) of the reflected signal.

U.S. Pat. No. 4,016,750 utilizes a controllable bandpass filter in an ultrasonic imaging system employing a variable gain amplifier. The center frequency and bandwidth of the filter are varied with time to track the depth and time dependent changes in the spectral distribution of echo signals.

An object of the present invention is an improved ultrasound scanning system.

Another object of the inventon is an ultrasonic scannng system which provides an improved display image.

A feature of the invention is the use of a variable high pass filter for signal gain control.

Another feature of the invention is the use of a variable filter which can be operator controlled.

Briefly, in accordance with the invention, time gain control of a reflected, echo signal is established by reducing with time the lower pass frequency of a variable filter. In a preferred embodiment the variable filter has high pass frequency characteristics since higher frequency echo signals are recognized as providing improved signal image resolution. As frequency and amplitude of reflected signals decrease with time and tissue depth, the lower pass frequency is reduced not only to track the reflected signal frequency, but also to pass an increasing portion of the spectrum of the reflected signal. Thus, decreasing amplitude is compensated by the increasing portion of the reflected signal spectrum. Use of a gain control amplifier is thus unnecessary for the reflected signal as maximum gain is employed without noise degradation of the signal. Importantly, control of the variable filter can be accomplished by the operator.

The invention and objects and features thereof will be more readily apparent from the following detailed description and appended claims when taken with the drawing, in which:

FIG. 2 is a functional block diagram of an ultrasound scanning system in accordance with one embodiment of the present invention.

Figure 1:
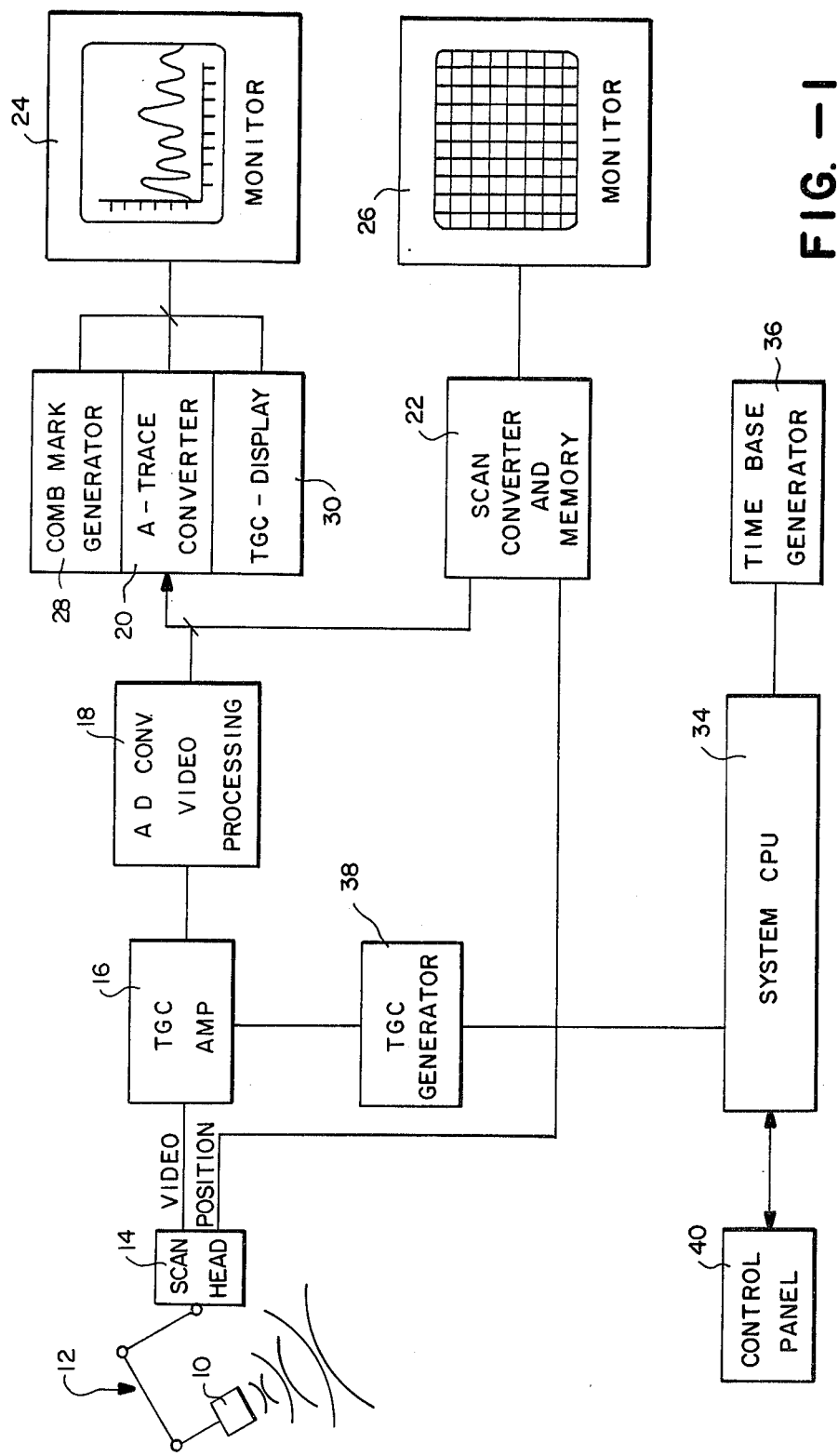
FIG. 1 is a functional block diagram of a conventional ultrasound scanning system.

Referring now to the drawings, FIG. 1 is a functional block diagram of an ultrasonic scanner. In this embodiment the system includes a transducer 10 mounted on a hinged arm system shown generally at 12 whereby transducer 10 can move freely in a single plane. Potentiometers in scanhead 14 and associated with the arms of the system generate signals indicative of the X and Y position of the scanner 10 in the plane of motion. Alternatively, the transducer can be a hand-held unit.

Transducer 10 transmits ultrasonic signals (e.g. on the order of 2 megahertz) and generates electrical signals in response to reflections of the transmitted ultrasonic signals. The generated signals are attenuated in time due to attenuation of the ultrasonic signal in passing through a patient.

The attenuated video signal is then applied to a variable gain amplifier 16, and the amplified signal is then applied to analog to digital conversion and video processing circuitry 18. The output of circuitry 18 is then applied to A trace converter circuitry 20 and to scan converter and memory circuitry 22 which generate the signals for controlling television monitors 24 and 26, respectively.

The A trace converter generates a signal for real time display of the amplitude of each reflected ultrasonic wave. The A trace data applied to monitor 24 identifies a horizontal position on the monitor (e.g. 1,000 positions) and an amplitude or vertical position associated with each horizontal position. This data controls the intensity of the electron beam in the display during raster line scanning by the beam. Scale markings for the displayed A trace are generated by comb mark generator 28, and a time gain compensation curve is provided by TGC-display generator 30.

A section view of the patient is displayed on monitor 26 in response to the scan converter and memory 22. The signal from circuitry 18 is converted for storage in a 512×512 memory matrix with each point in the matrix accommodating a 5 bit brightness code. The matrix corresponds to the pixels on the display of monitor 26 with the brightness code being indicative of the Grayscale for the pixels.

Heretofore, system control has been provided by a central processing unit 34 which also controls a time base generator 36 which generates the timing signals for the system. A time gain compensation (TGC) control generator 38 generates the control signal for amplifier 16 and a control panel 40 is provided for manual control of the system through the central processing unit.

Copending application Ser. No. 369,370, supra, describes a method for characterizing an attenuative, echogenic medium by measuring the return echo mean frequency versus depth of origin of echos. The method is derived from a description of ultrasound attenuation applicable to the anatomical case that imposes a frequency-dependent linear attenuation process and a separate frequency dependency related to the physics of reflection. The amplitude of the echo signal is described by the following relation:

$$y(f)^2 = (f^z)(e^{-a_0 lf})(e^{-(f-f_0)_2^2})A(f)^2$$

The first term ($f^z$) assigns an exponent to the reflection frequency dependency, assuming a value of zero for specular reflection up to a value of four for Rayleigh scattering. The exponent, z, can be expected to take on a very narrow range of values in tissue. The second term describes the linear attenuation using the attenuation coefficient $a_0$. The third term is the Gaussian incident spectrum, and the last term is a random scatter variable depicting noise modulation.

This physical model for ultrasound interactions with tissue leads to the conclusion that, given the Gaussian shape to the incident spectrum, a rigorous interrelation exists between mean frequency of return echoes and amplitude of return echoes. The return echo spectrum is expected to remain Gaussian independent of depth and the center frequency is expected to decrease monotonically with depth. Thus, it is possible to establish a time gain curve to filter control map that will be generally applicable to all anatomical cases with errors to the correspondence occuring only for shifts in "z", which, again, are expected to be small.

As above described, both the amplitude and frequency of a reflected ultrasonic signal vary with time and tissue depth. In accordance with the present invention the time gain control amplifier as used in the prior art is replaced with a variable frequency filter to obtain a programmed or operator-controlled signal for video processing. FIG. 2 is a functional block diagram of one embodiment of the filter and control as used in the system of FIG. 1. The time gain controlled amplifier 16 of FIG. 1 is replaced by a variable filter 44 which receives the electrical signals generated by transducer 46 in response to reflected signals and passes the filtered signals on to the log amplifier 47 and an AM detector 48. The detected signal is then applied through an amplifier 49 the gain of which is set at a maximum value while not allowing noise degradation of the amplified signal. The maximum gain is established by an automatic noise servo mechanism 50 which applies a signal through a digital to analog converter 51 to establish the maximum gain for the amplifier 49. The amplified signal is then passed on to the analog to digital conversion video processing circuitry 52, which is similar to the conversion and video processing circuitry 18 of FIG. 1.

Filter 44 may be a high pass or a bandpass filter having a low pass or cut-off frequency. Control of the filter is achieved by a time gain control-time spectrum control translator 53 which correlates the time gain control signal generated in the system of FIG. 1 to a time varying frequency spectrum signal which establishes the lower cut-off or low pass frequency for the filter 44. Control of the TGC unit 54 can be manually implemented from control panel 55 as well as by system CPU control.

Figure 3A:
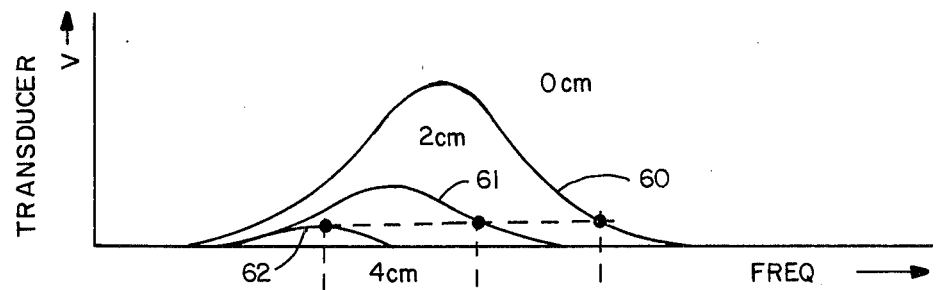
FIG. 3A is a graph illustrating a reflected ultrasound signal.
Figure 3B:
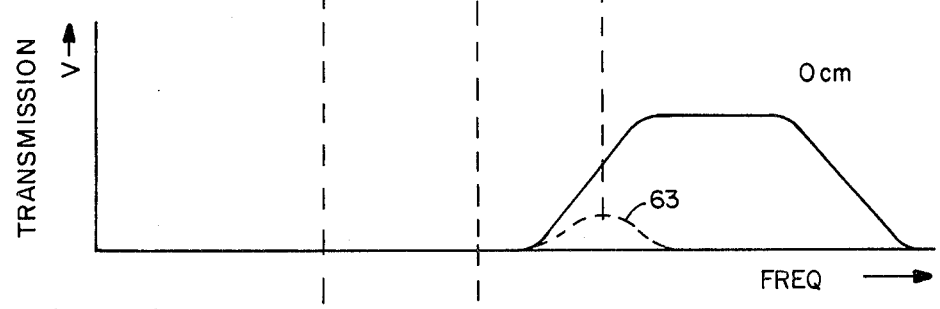
FIGS. 3B-3D are graphs illustrating the frequency characteristics of a variable frequency in accordance with one embodiment of the present invention.
Figure 3C:
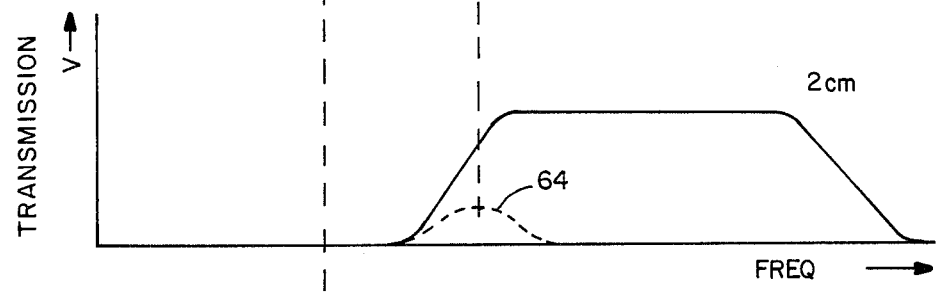
Figure 3D:
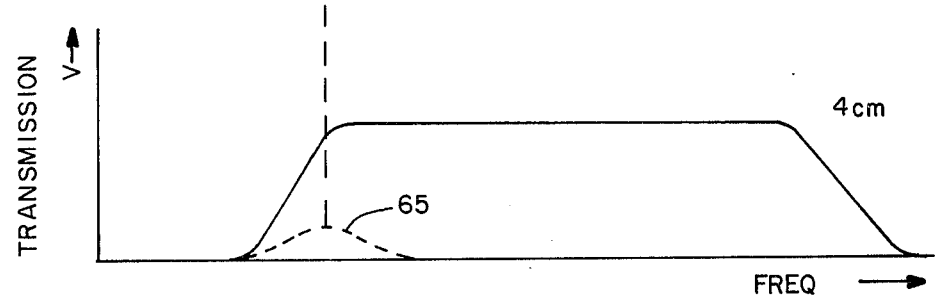

Operation of the variable filter will be more readily appreciated from the plot of three echo signals in FIG. 3A and the frequency characteristics of a band pass filter which is shown in FIGS. 3B–3D. Referring to FIG. 3A the transducer voltage output in response to signal reflected at 0 cm in depth, 2 cm in depth, and 4 cm in depth are plotted as a function of frequency. It will be noted that the signal reflected from 0 cm depth has a frequency spectrum at a higher center frequency than the other signals. The signals reflected from tissue at 2 cm and 4 cm in depth have lower maximum amplitudes and lower center frequencies for the spectrums of the echo signals. However, points 60, 61, and 62 on each of the curves have the same voltge magnitude.

Referring to FIG 3B, the frequency characteristics of the bandpass filter is illustrated for receiving the signal reflected from 0 cm tissue depth. The frequency spectrum 63 is passed. It will be noted that the low pass frequency is selected so that the voltgae at point 60 is passed without attenuation.

In FIG. 3C the frequency characteristics of the filter are shown for the signal reflected from 2 cm tissue depth. The frequency spectrum 64 is passed and the low pass frequency is selected at a frequency closer to the center frequency of the spectrum at 2 cm whereby the voltage at point 61 is passed without attenuation.

FIG. 3D is the filter frequency characteristics for receiving the signal at 4 cm tissue depth. The spectrum 65 is passed and the low pass frequency of the filter is moved whereby the voltage at point 62 is passed without attenuation. It will be noted that only the lower pass frequency of the filter needs to be shifted; the upper frequency can remain constant.

Accordingly, the electrical signals passed by the filter 44 as shown at 63, 64, and 65, are essentially the same magnitude and frequency width. Thus, gain is automatically established to achieve a desired signal magnitude by adjusting the filter frequency pass characteristics. Importantly, the system operator can establish the filter characteristics manually using the control panel. For example, the operator may wish to magnify the reflected images at a particular depth in tissue, and this can be readily accomplished by controlling the frequency characteristics of the filter.

There has been described an ultrasound scanning system in which desired amplitudes of reflected signals are established by passing the signals through a variable high pass or bandpass filter. The filter can be automatically controlled by computer means to provide a preestablished signal characteristic, or alternatively the system operator can vary the filter to achieve a desired signal response.

While the invention has been described with reference to a specific embodiment, the description is illustrative of the inventon and is not to be construed as limiting the invention. Various modifications and applications may occur to those skilled in the art without departing from the true spirit and scope of the invention as defined by the appended claims.

What is claimed is:

1. In an ultrasound scanning system in which reflected ultrasound waves are received by transducer means and in response thereto generates electrical signals, a method of processing said electrical signals to provide signals of a desired amplitude comprising the steps of applying said electrical signals to a variable electrical filter which passes signals above a low pass frequency, and time varying said low pass frequency as said electrical signals are applied thereto.

2. The method as defined by claim 1 wherein said low pass frequency is correlated to time attenuation of said electrical signals and to frequency shift of said electrical signals.

3. In an ultrasound scanning system in which reflected ultrasound waves are received by transducer means and in response thereto generates electrical signals, apparatus for processing said electrical signals to provide signals of desired amplitude comprising an electrical filter with controllable and variable frequency pass and cut-off characteristics, means for applying said electrical signals to said filter, and means for manually time varying the lower pass frequency of said variable frequency pass characteristics of said filter as said electrical signals are applied thereto.

4. Apparatus as defined by claim 3 wherein said lower pass frequency is correlated to time attenuation of said electrical signals and to frequency shift of said electrical signals.

5. Apparatus as defined by claim 3 wherein said means for time varying said variable frequency pass characteristics includes a manually operable control panel.

6. An ultrasonic scanning system comprising
transducer means for transmitting and receiving ultrasound signals and generating electrical signals in response thereto,
an electrical filter having variable and controllable frequency pass characteristics,
means for applying said electrical signals to said electrical filter,
means for time varying the lower pass frequency of said variable frequency pass characteristics of said filter as said electrical signals are applied thereto, whereby the electrical signals passed by said filter have desired amplitudes,
display means, and
means for receiving and processing electrical signals passed by said filter and controlling said display means therewith.

7. The ultrasonic scanning system as defined by claim 6 wherein said filter comprises a bandpass filter including a variable lower pass frequency.

8. The ultrasound scanning system as defined by claim 6 wherein said filter comprises a high pass filter including a variable lower pass frequency.

9. The ultrasonic scanning system as defined by claim 6 wherein said means for time varying said variable frequency characteristics includes a translator means for translating a time gain control signal to a time spectrum control signal for applying to said filter.

* * * * *

UNITED STATES PATENT AND TRADEMARK OFFICE
CERTIFICATE OF CORRECTION

PATENT NO. : 4,472,972
DATED : Sept. 25, 1984
INVENTOR(S) : James K. Riley and William R. Hardin It is certified that error appears in the above—identified patent and that said Letters Patent is hereby corrected as shown below:

In the Abstract, line 7, after "low" add --pass--.

The equation in Col. 3, line 25, should read as follows:

$$y(f)^2 = (f^z)(e^{-a_0 1 f})(e^{-(f-f_0)^2}) A(f)^2$$

Signed and Sealed this

Nineteenth Day of February 1985

[SEAL]

Attest:

DONALD J. QUIGG

Attesting Officer     Acting Commissioner of Patents and Trademarks